Nov. 28, 1961 P. D. DILLEY 3,010,740
PIPE COUPLING HAVING NUT SPACER MEANS
Filed Jan. 10, 1958
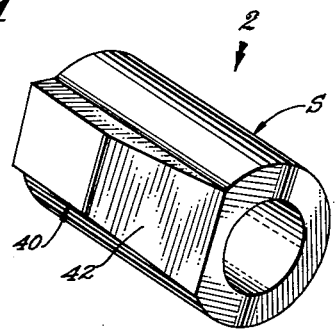
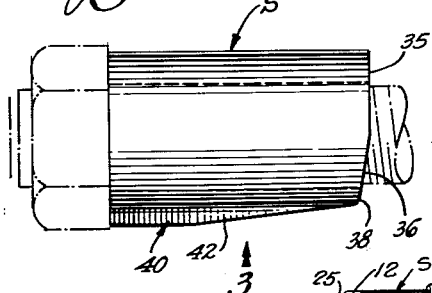
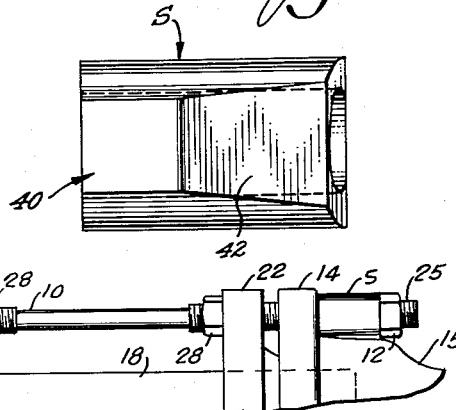
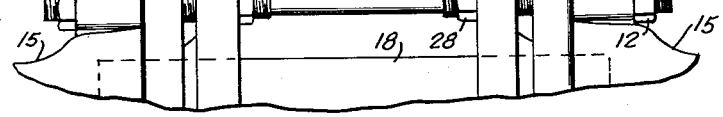
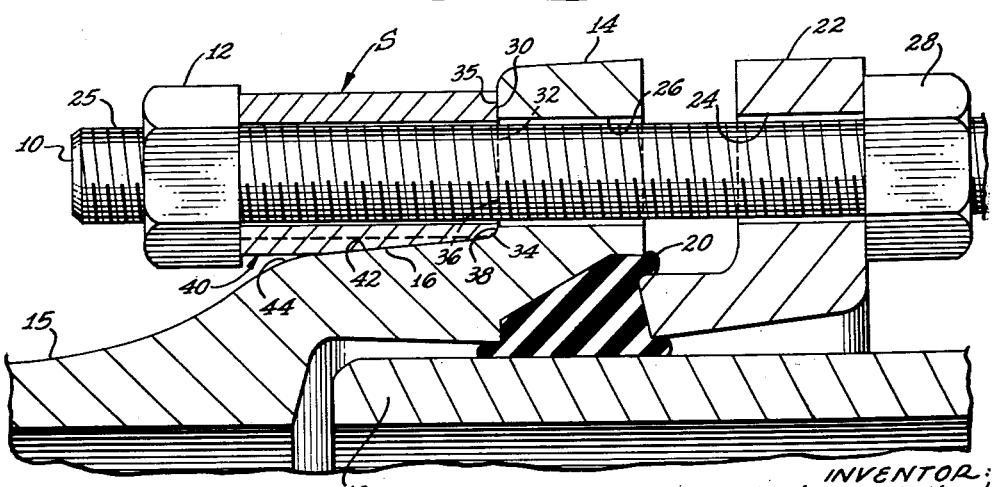
INVENTOR:
Porter D. Dilley
Attorneys

United States Patent Office 3,010,740
Patented Nov. 28, 1961

3,010,740
PIPE COUPLING HAVING NUT SPACER MEANS
Porter D. Dilley, 1419 Atchison St., Pasadena, Calif.
Filed Jan. 10, 1958, Ser. No. 708,146
4 Claims. (Cl. 285—341)

This invention relates to standardized cast-iron pipe that is designed for mechanical joints and, more particularly, the invention is directed to an improved nut spacer for use on a tie rod at this pipe joint.

Cast-iron pipe of the type to which the invention pertains is used for pressurized water and gas lines and is commonly buried in the soil where corrosion is a problem. Cast-iron is used for the pipe material because of its exceptional resistance to corrosion as well as because of its strength. The high fluid pressures that are involved often require the addition of longitudinal tie rods across the mechanical joints of the pipe at valves and/or fittings and since the pipe flange at the bell of such a joint is of insufficient radial dimension to accommodate a conventional hexagonal nut on a tie rod, it is necessary to employ a nut spacer or spacer sleeve on the tie rod to position the nut clear of the pipe bell.

The current practice has been simply to cut three-quarter inch steel pipe into short lengths to serve as nut spacers for this purpose. This use of nut spacers made of steel pipe has been prevalent for many years, notwithstanding the fact that there are serious drawbacks to the practice.

It is a serious drawback that the steel pipe nut spacers are vulnerable to corrosion. Even partial deterioration of such a nut spacer by corrosion may completely destroy the effectiveness of the tie rod for its purpose. To meet this defect it is common to paint the steel pipe nut spacers as well as the tie rod with a viscous protective coating material such as tar-base asphalt. Unfortunately, however, only the outer circumferential surface of the steel pipe nut spacer is coated, the inner surface remaining untouched and exposed for chemical and electrolytic corrosion. It is to be further noted that the steel pipe nut spacers are painted after they are completely installed, when the ends of the nut spacers are not accessible. Consequently, the ends of the steel pipe nut spacers are also subject to accelerated corrosion.

Another drawback is that a steel pipe nut spacer does not have as high strength in longitudinal compression as is desirable. The axial compressive strength of a steel pipe nut spacer is not at all commensurate with the high tensile strength of the tie rod on which it is mounted. Steel pipe nut spacers are prone to buckle slightly under the high compressive load and too often such buckling is concealed by the thick coating of protective material and completely escapes notice.

Another serious drawback is that the surface of the radial flange of the cast-iron pipe adjacent the pipe bell where the steel pipe nut spacer is used, does not have a completely flat surface for abutment by the steel pipe nut spacer. In fact, the abutment surface of the cast-iron pipe flange changes direction within the diameter of the steel pipe nut spacer. An outer radial portion of the cast-iron pipe flange conforms to a plane that is at least approximately perpendicular to the axis of the pipe but an inner radial portion is inclined from that plane and, moreover, is curved at the radially innermost region of the pipe flange where a fillet transition is made to the pipe bell.

If the corresponding end of the steel pipe nut spacer is cut squarely, i.e. normal to the axis of the nut spacer, the only contact between the nut spacer end and the radial pipe flange will be at the innermost radial region of the flange. On the other hand, if the pipe for the nut spacer is cut at a slant, at best there will be only two diametrically opposite points of contact with a large gap between the two points. More often than not, there is only one point of contact, even when the pipe is cut at a slant.

It is possible to form the end of the steel pipe nut spacer to a shape for effective full area contact with the irregular surface of the radial pipe flange but the careful handwork required is far too time-consuming and too costly to be feasible. Consequently, steel pipe nut spacers make only point contact with the radial flange of the cast-iron pipe instead of making full area abutment with the pipe flange. The one point is either a radially outward point or a radially inward point and, of course, either of these locations results in unbalanced longitudinal compression of the steel pipe nut spacer effective to cant the steel pipe nut spacer out of alignment with the tie rod. Moreover, the concentration of stresses too often results in cracking of the steel pipe spacer and unfortunately such damage is concealed by the heavy viscous protective coating.

The present invention meets this problem by providing a cast-iron nut spacer especially shaped for use on a tie rod adjacent a pipe flange in the region of the bell of a cast-iron pipe. The inner end of the cast-iron nut spacer of the invention conforms accurately with the non-planar surface of the flange of the cast-iron pipe so that the whole end area of the nut spacer abuts and conforms to the surface contour of the pipe flange for uniform stress distribution over a maximum area. The nut spacer abuts the pipe flange squarely in every instance because the nut spacer is cast with the same degree of uniformity and accuracy as the cast-iron pipe flanges. In the preferred practice of the invention the end surface of the cast-iron nut spacer is further formed with a curved heel to conform with the curvature of the transition fillet at the root of the pipe flange.

A further feature of the cast-iron nut spacer of the invention is that it may be formed with a relatively thick circumferential wall having a compressive strength commensurate with the tensile strength of the tie rod on which it is used.

The transition fillet at the root of the flange of the cast-iron pipe immediately adjacent the pipe bell is so close to the tie rod that the wall of the cast-iron nut spacer is necessarily thin in this region. The bell of the pipe slopes away from the tie rod, however, and the invention takes advantage of this fact by casting the nut spacer with a correspondingly tapered longitudinal rib to compensate for the locally reduced thickness of the nut spacer wall.

The integral longitudinal reinforcement rib not only makes the nut spacer substantially uniform in compressive strength around its circumference but also provides a longitudinal surface bearing directly and snugly against the tapering surface of the pipe bell. A special advantage is that the lateral abutment of the rib against the pipe bell locks the nut spacer from rotating as the tie bar is tightened and thus keeps the inner end of the nut spacer accurately oriented relative to the juxtaposed complemental surface of the cast-iron pipe flange. An additional advantage of the rib is that it serves as index means facilitating the correct assembly of the tie rod components. Thus, in installing the nut spacer on the tie rod the nut spacer is turned with the rib against the bell of the pipe for correct orientation of the end surface of the nut spacer relative to the face of the cast-iron pipe flange.

The various features, objects and advantages of the invention may be understood by reference to the following detailed description, together with the accompanying drawing.

In the drawing, which is to be regarded as merely illustrative;

FIGURE 1 is a perspective view of the presently preferred cast-iron nut spacer of the invention;

FIGURE 2 is a side elevation of the cast-iron nut spacer viewed from the direction indicated by the arrow 2 in FIGURE 1, an associated tie rod and nut being shown in phantom;

FIGURE 3 is an elevational view of the cast-iron nut spacer as seen in the direction of the arrow 3 of FIGURE 2;

FIGURE 4 is a fragmentary sectional view showing how the nut spacer is installed on the end of a tie rod between a cast-iron pipe flange and a nut on the outer end of the tie rod; and FIGURE 5 is a fragmentary side elevation view showing the upper half of lengths of cast iron pipe having a pair of adjacent joints held locked together and reinforced by the tie rod assembly of the present invention.

FIGURE 4 shows how a cast-iron nut spacer, generally designated by the letter S, and representing a preferred embodiment of the invention, is typically installed on a tie rod 10 between a nut 12 on the outer end of the tie rod and a radial flange 14 forming part of a bell 16 provided on conventional cast-iron pipe 15. A spigotted end 18 of a second pipe section or the complementary end of a valve or the like, telescopes into the bell 16 and is sealed by a surrounding conventional packing ring 20 of rubber-like material. A conventional packing gland follower 22 having the usual circular series of bolt holes 24, exerts pressure against the packing ring 20 to hold the packing ring in sealing contact with the inner surface of the bell 16 and with the outer surface of the spigot 18 in a well known manner.

The tie rod 10 is plain throughout the major portion of its length but has screw threads 25 on its opposite ends. Thus FIGURE 4 shows a screw thread 25 on the tie rod 10 that is long enough to extend past the gland 22. The tie rod 10 extends through a bolt hole 24 of the gland 22 and through a corresponding aligned bolt hole 26 in pipe flange 14.

It can be seen that the end of the tie rod 10 shown in FIGURE 4 is anchored by the nut 12 and the cooperating nut spacer S in abutment against the pipe flange 14, the other end of the tie rod customarily being anchored in a similar manner in a reversely facing bell and spigot joint on the opposite end of a valve or the like to the right of FIGURE 4. The nut 12 and the corresponding nut on the other end of the tie rod 10 hold the tie rod in tension to resist the tendency of the pressure of the fluid inside the pipe to cause separation of the parts at the bell and spigot joint.

For smaller pipe sizes there are two tie rods 10 at diametrically opposite positions. Larger pipe diameters require a greater number of equally spaced tie rods.

A nut 28 in engagement with the screw thread 25 is mounted on the tie rod 10 in abutment against the gland follower 22 and cooperates with the nut 12 and the nut spacer S to hold the gland follower in pressure contact with the packing ring 20. All of the bolt holes 24 of the gland follower 22 are paired with the bolt holes 26 of the pipe flange 14 and the pairs of bolt holes that are not occupied by the tie rods 10 are occupied by cast-iron T-bolts (not shown) in a well-known manner for further application of sealing pressure against the gland follower 22.

As may be understood by reference to FIGURE 4, the face of the cast-iron pipe flange 14 against which the nut spacer S abuts has an outer radial portion in the region designated by the numeral 30 that is approximately perpendicular to the axis of the cast-iron pipe and the axis of the tie rod 10. This face of the cast-iron pipe flange 14 has an adjacent inner radial portion in the region designated by numeral 32 that is slightly inclined from the perpendicular, the inclination being axially inward relative to the nut spacer S. Finally, at the innermost radial portion of the cast-iron flange 15 in the region indicated by numeral 34 is a curved fillet transition from the flange 14 to the bell 16.

For maximum area of pressure contact of the cast-iron nut spacer S with the pipe flange 14, the face at the inner end of the nut spacer has a portion 35 that is substantially perpendicular to the axis of the nut spacer to mate with the outer radial portion 30 of the pipe flange face; the end face of the nut spacer has an adjacent portion 36 that is inclined axially inwardly of the nut spacer from the portion 35 to mate with the inner radial portion 32 of the pipe flange face; and, preferably, the end face of the nut spacer has a curved heel 38 to conform with at least a marginal portion of the transition fillet 34 at the root of the flange face.

It can be seen in FIGURE 4 that the clearance between the tie rod 10 and the bell 16 is relatively narrow immediately adjacent the pipe flange 14. The cast-iron nut spacer S has a relatively thick wall as shown in the drawing for high compressive strength but this wall must be reduced in thickness to occupy the restricted clearance space adjacent the pipe bell 16. The cast-iron nut spacer S is formed with an integral longitudinal reinforcement rib 40 to compensate for the local reduction in thickness of the nut spacer wall at the inner end of the nut spacer.

The rib 40 has a tapered face 42 for abutment against the correspondingly sloping surface of the bell 16. This taper face 42 functions as a longitudinal bearing surface for contact with the bell 16 to stabilize the installed spacer sleeve. A further function of the rib 40 with its taper face 42 is to engage the bell 16 in a manner to prevent rotation of the spacer sleeve in frictional response to tightening rotation of the nut 12.

A still further function of the reinforcement rib 40 is to serve as index means for correct rotational orientation of the nut spacer for mating of the end surfaces 35, 36 and 38 of the nut spacer with the corresponding portions 30, 32 and 34 of the pipe flange 14. Thus merely placing the rib 40 of the nut spacer against the bell 16 places the nut spacer in its correct rotational orientation.

It is to be noted that the cast-iron nut spacer S is long enough to extend beyond the shoulder 44 of the bell 16 for a sufficient distance to place the nut 12 clear of the bell so that the nut may be freely tightened by a wrench to place the tie rod 10 under longitudinal tension.

In contrast to the usual steel pipe nut spacer that has been used for this purpose for many years, the nut spacer S, being made of cast-iron, is as immune to corrosion as the cast-iron pipe on which it is mounted. Consequently there is no need to coat the nut spacer S with the usual viscous protective material.

The cast-iron nut spacer S is greatly superior to the usual steel pipe nut spacer sleeve in its compressive strength. Since the nut spacer conforms closely to the configuration of the face of the pipe flange 14, it distributes the stresses involved over a corresponding area of the pipe flange and the stress distribution is uniform over this area. It is also to be noted that the nut spacer S is exceptionally stable in its installed position not only because the end face of the nut spacer conforms to the surface of the pipe flange 14 but also because the taper face 42 of the rib 40 conforms to the taper of the pipe bell 16. Consequently there is no tendency whatsoever for the spacer sleeve S to cant out of coaxial alignment with the tie rod 10.

My description in specific detail of the presently preferred embodiment of the invention will suggest various changes, substitutions and other departures from my disclosure within the spirit and scope of the appended claims.

I claim:

1. That improvement in a standard mechanical flanged bell and spigot type coupling for cast iron pipe, said coupling being of the type having the spigot end of one pipe telescoped into the radially flanged bell end of an adjacent pipe, a gland follower ring loosely encircling said spigot having an axially extending annular flange adapted to compress resilient packing between the nested portions of said coupling when shifted axially toward the flange of said bell end, said improvement comprising a plurality of threaded fasteners extending through certain ones of aligned openings of said gland follower ring and said flanged bell and including a plurality of tie rods having threaded ends extending through other ones of said aligned openings, said tie rods extending along the opposite lateral sides of one of said cast iron pipes to a point of anchorage spaced axially away from said coupling, separate elongated spacer sleeves separable from said flanged bell fitting loosely over the threaded ends of said tie rods along portions thereof positioned closely beside the bell portion of said coupling, one end and one exterior side wall of each sleeve being contoured complementally to the juxtaposed surface of the bell and the adjacent radial wall surface of the bell flange, each sleeve having a length in excess of the axial length of the bell portion of said flanged bells, and a pair of nuts carried by the threaded portions of said tie rods one of which nuts bears against the end of said follower ring remote from said bell flange and the other of which nuts bears against the end of said spacer sleeve remote from said gland follower ring, and each of said nuts being turnable along the threaded portion of said tie rods to aid in compressing said resilient packing as the coupling parts are tightened, and the nut bearing against said spacer sleeve being freely rotatable to compress said spacer sleeve into high pressure contact with said bell and with said flange without risk of interference between said nut and the bell portion of said coupling.

2. That improvement defined in claim 1 characterized in that said spacer sleeve is of unmachined cast iron.

3. That improvement defined in claim 1 characterized in that the end of said spacer sleeve in contact with bell flange lies generally in a plane slightly less than normal to the sleeve axis and in that one longitudinal face of said sleeve is shaped to bear against the exterior side wall surface of said bell end and resist any force tending to rotate the sleeve about the axis of the associated tie rod.

4. That improvement defined in claim 1 characterized in that said spacer sleeve includes a protuberance from the outer side wall thereof and having surfaces shaped to bear against the juxtaposed surface of said bell end and prevent rotation of the sleeve about said tie rod.

References Cited in the file of this patent

UNITED STATES PATENTS

| | | |
|---|---|---|
| 575,577 | Smith | Jan. 19, 1897 |
| 762,929 | McCullock | June 21, 1904 |
| 765,484 | Hochstein | July 19, 1904 |
| 769,131 | Dillenburg | Aug. 30, 1904 |
| 1,016,798 | Thomson | Feb. 6, 1912 |
| 1,324,036 | DeLaval | Dec. 9, 1919 |
| 1,365,530 | Moore | Jan. 11, 1921 |
| 1,447,192 | Watson | Mar. 6, 1923 |
| 1,830,782 | Burnish | Nov. 10, 1931 |
| 1,873,620 | Moore | Aug. 23, 1932 |
| 1,896,062 | Berry | Feb. 7, 1933 |
| 1,995,042 | Powers | Mar. 19, 1935 |
| 2,108,848 | Engel et al. | Feb. 22, 1938 |
| 2,157,008 | Owen | May 2, 1939 |
| 2,383,248 | Garrett | Aug. 21, 1945 |
| 2,637,197 | Kaney | May 5, 1953 |

FOREIGN PATENTS

| | | |
|---|---|---|
| 517,580 | Belgium | Feb. 28, 1953 |